US012655830B2

(12) United States Patent　(10) Patent No.: US 12,655,830 B2

Reynolds et al.　(45) Date of Patent: Jun. 16, 2026

(54) ENERGY CONVERTER MODULE

(71) Applicant: Blue Economy CRC Co, Newnham (AU)

(72) Inventors: Michael Anthony Reynolds, Newnham (AU); Adrian Chiem, Newnham (AU); Johannes Straub, Newnham (AU); Rodney Spencer Thomson, Newnham (AU)

(73) Assignee: Blue Economy CRC Co, Newnham (AU)

( * ) Notice: Subject to any disclaimer, the term of this patent is extended or adjusted under 35 U.S.C. 154(b) by 0 days.

(21) Appl. No.: 18/836,117

(22) PCT Filed: Feb. 10, 2023

(86) PCT No.: PCT/AU2023/050090

§ 371 (c)(1),
(2) Date: Aug. 6, 2024

(87) PCT Pub. No.: WO2023/150835

PCT Pub. Date: Aug. 17, 2023

(65) Prior Publication Data

US 2025/0163895 A1　May 22, 2025

(30) Foreign Application Priority Data

Feb. 10, 2022　(AU) ................................ 2022900276

(51) Int. Cl.
　　*F03G 1/02*　　　(2006.01)
　　*F03G 1/08*　　　(2006.01)
(52) U.S. Cl.
　　CPC ............. *F03G 1/029* (2021.08); *F03G 1/022* (2021.08); *F03G 1/08* (2013.01)

(58) Field of Classification Search
CPC . F03G 1/022; F03G 1/029; F03G 1/08; F03B 17/025; F05B 2260/50
See application file for complete search history.

(56) References Cited

U.S. PATENT DOCUMENTS 2,063,799 A　12/1936　Fornelius et al.
4,635,755 A　1/1987　Arechaga
(Continued)

FOREIGN PATENT DOCUMENTS

CN　　110177534 A　*　8/2019　....... A61B 17/22004
CN　　110397549 A　*　11/2019
(Continued)

OTHER PUBLICATIONS

International Search Report & Written Opinion of PCT/AU2023/050090 dated May 17, 2023, 8 pages.
(Continued)

*Primary Examiner* — Phillip A Johnson
(74) *Attorney, Agent, or Firm* — Braxton IP PLLC; Bobby W. Braxton

(57)　　　ABSTRACT

An energy converter for converting rotational energy to mechanical strain energy in flat spiral springs, the converter unit including: an axle for operatively mounting a plurality of spiral springs having inner ends and outer ends; at least a first and second spiral spring module, each module including one or more spiral springs operatively mounted at each inner end to the axle, one or more of the springs in each of the spiral spring modules having their outer ends operatively connected together with a link extending between the first and second spiral spring modules, wherein the arrangement of radial spiral windings in the first and second spiral spring modules are substantially reflected or mirrored across a plane disposed between the first and second spiral spring modules.

9 Claims, 10 Drawing Sheets

(56) References Cited

U.S. PATENT DOCUMENTS

| | | | | | |
|---|---|---|---|---|---|
| 8,648,485 B1 * | 2/2014 | Grossi | .................... | F03B 13/14 290/53 |
| 2002/0191493 A1 | 12/2002 | Hara | | |

FOREIGN PATENT DOCUMENTS

| | | | | |
|---|---|---|---|---|
| DE | 102010005678 A1 * | 11/2011 | ............ | F03B 17/025 |
| JP | 60119385 A * | 6/1985 | | |

OTHER PUBLICATIONS

Examination Report No. 1 for AU2023216978 dated Sep. 5, 2024, 3 pages.

* cited by examiner

ENERGY CONVERTER MODULE

PRIORITY

This application is a National Stage Application from PCT/AU2023/050090 filed Feb. 10, 2023 which claims priority to Australian patent application number 2022900276, filed Feb. 10, 2022, the entirety of all of which are incorporated herein by reference. The instant application claims priority hereby to both PCT/AU2023/050090 and Australian Patent Application AU 2022900276.

TECHNICAL FIELD

The present technology relates generally to an energy converter module which converts rotational energy to strain energy for release by using a spiral spring arrangement to apply a force-displacement profile.

BACKGROUND ART

There are certain energy sources available on Earth that are intermittent or otherwise infrequent. Renewable sources such as solar, tidal, wave or wind energy fall into these categories.

Converting this kind of energy to another form is of particular relevance and utility since it can be released for use at certain portions of a production cycle. This can smooth the delivery of the power from the renewable source, leading to greater round-trip efficiency.

Storage of intermittent or infrequent electrical energy can also be achieved by converting to rotational energy and then to mechanical strain energy of materials. Mechanical strain energy is stored without requiring heat insulation for protection from dangerous temperatures, and also without requiring dangerous chemicals, furthermore limited in availability. Some attempts have been made in the mechanical conversion and storage area using springs, in particular, planar or flat spiral springs, but they have limitations. For example, inner windings of some planar spiral spring designs can contact one another too soon in a cycle when winding up, and/or experience higher strain than the outer windings.

The present technology provides an energy storage module using planar or flat spiral springs which substantially ameliorates one or more of the disadvantages described above or at least provides an alternative to known energy converter modules.

SUMMARY OF INVENTION

Broadly, the present technology provides an energy converter unit which serially connects two or more spiral spring modules together in an axially symmetric way by operatively connecting the component spring elements together at their free ends. The arrangement is such that the operative connection of the free ends facilitates radial movement during tensioning or release, across the spring elements in the spring assemblies. In embodiments, there are provided two spiral spring assemblies, each one including a pair of spring elements oppositely-wound from one another.

Furthermore, broadly, the technology, for a given torque input direction, provides a multi-spiral spring energy converter where all spiral spring elements are wound to increasing tension. The arrangement is such that the spiral spring element receiving its input torque from an inner end (i.e. directly from an axle) is wound up, and so is the other spring element that receives its input torque from an outer connection link and connects to a frame at its inner end.

Thus, in accordance with one aspect of the present invention there is provided an energy converter for converting rotational energy to mechanical strain energy in spiral springs, the converter unit including:

a frame;

an axle for receiving a torque, the axle operatively mounted on the frame for rotation;

a plurality of spiral spring modules, each one operatively mounted to the axle and the frame so as to store the torque as strain energy, each spring module including at least first and second serially-connected spiral spring elements having first and second ends radially spaced from one another, the first spiral spring element being oppositely-wound from the second spring element, the first end of at least one of the serially connected spring elements being operatively connected to the axle, with the first end of at least one other serially connected spring element being operatively connected to the frame, wherein the second end of each spring element is free to move radially inward and outward, and operatively connected by a link such that the link extends across all the second ends of the springs in the plurality of spring modules.

In one embodiment the windings of the spring elements in the first and second spring modules are substantially reflected or mirrored across a plane disposed between the first and second spiral spring modules.

In one embodiment the spiral spring elements are flat spiral springs.

In one embodiment the first end of any one of the spiral springs is disposed radially inner relative to the second end.

In one embodiment the first and second spiral springs in each module include a first spiral spring and a second spiral spring operatively connected to one another by the link extending between the outer ends.

In one embodiment the link is a bar linking the outer ends of the spiral spring assemblies and modules to allow pivoting between the outer ends of adjacent springs.

In one embodiment the link is a plate assembly that is fastened to the outer ends of the springs in the first and second spring modules.

In one embodiment the plate assembly includes a base plate and a closure plate

In one embodiment there is provided a power input operatively connected to the guide axle to rotate the pivoting connection for storage of energy in the springs.

In one embodiment there is a power takeoff for release of energy stored in the springs.

In one embodiment there is a clutch for controlling release and storage of energy in the springs.

In one embodiment there is provided a brake for controlling release and storage of energy in the springs by inhibiting rotation of the one or more sleeve axles.

In one embodiment a flywheel is provided to smooth energy delivery on release of the spring energy.

In one embodiment a gearbox is provided to facilitate energy release from the springs.

BRIEF DESCRIPTION OF DRAWINGS

To enable a clearer understanding, the technology will now be described with reference to the attached drawings, and in those drawings.

DESCRIPTION OF EMBODIMENTS

Figure 9:
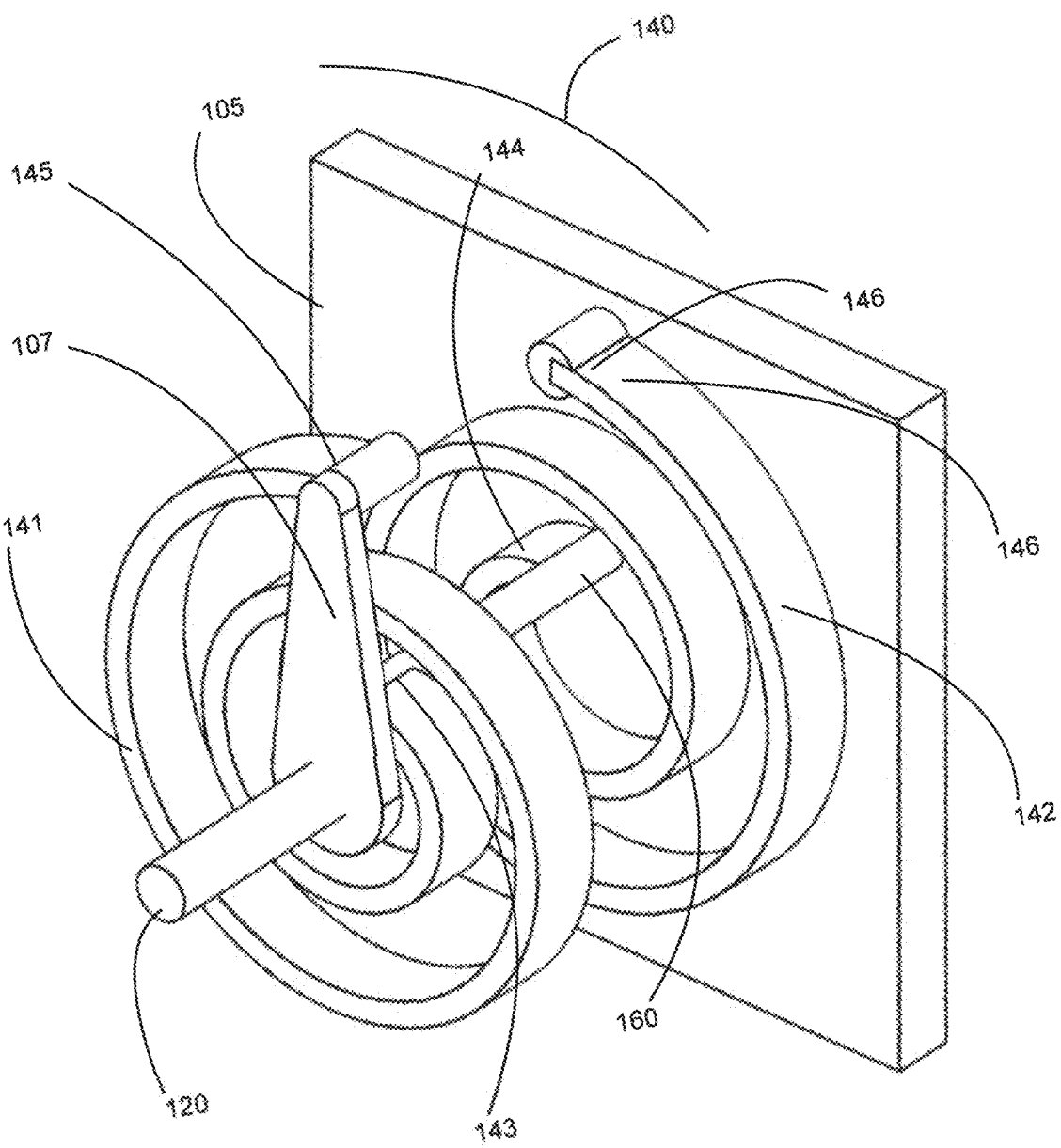
FIG. 9 is an isometric view of a different embodiment of spiral spring module in which there is provided a connecting link, not on the radially outer ends of the spiral spring elements, but the radially inner ends.
Figure 10:
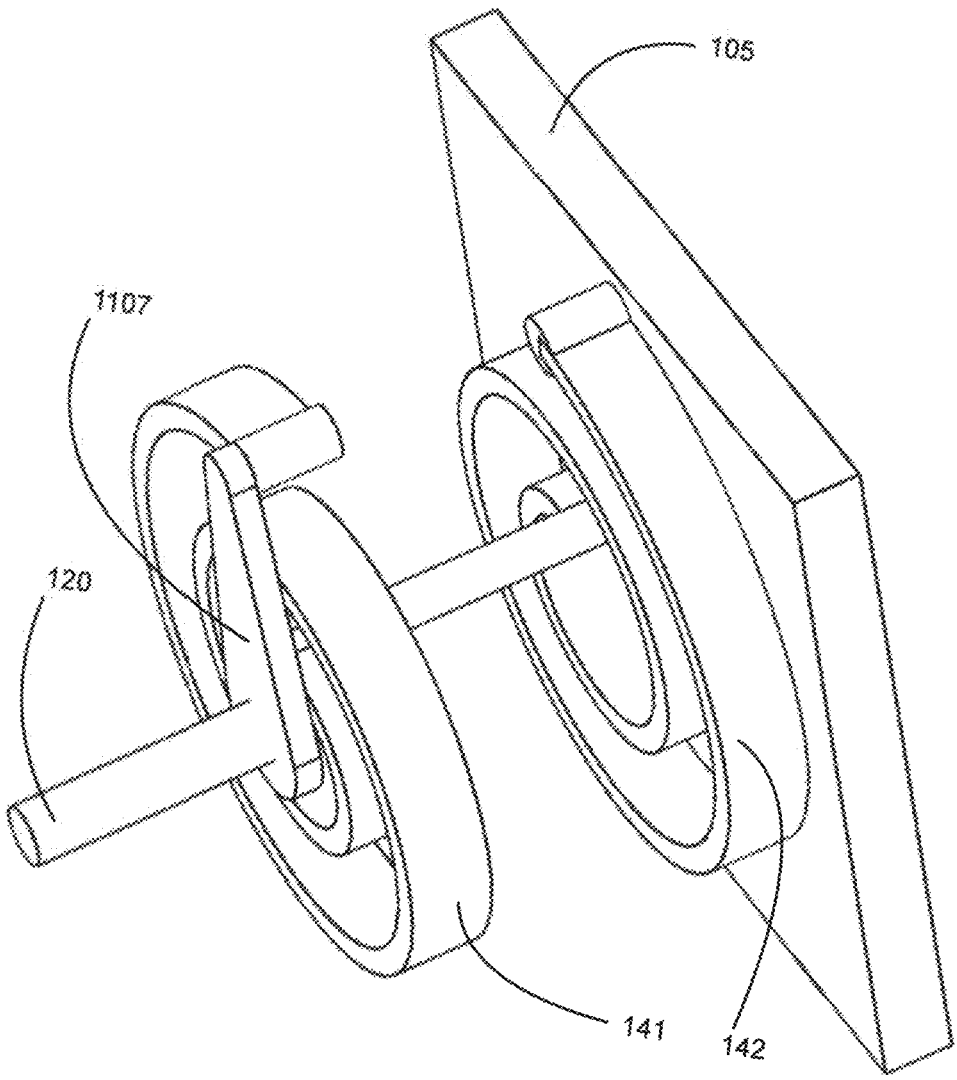
FIG. 10 is a slightly different isometric view of the embodiment shown in FIG. 9, to slightly more clearly show the link connecting the oppositely-wound spiral springs in the first spring module.

Referring to the drawings there are shown two embodiments of an energy converter, the first embodiment shown at FIGS. 1, 2, 3, 4 and 7 and 8 generally indicated at 10 for converting rotational energy to mechanical strain energy in flat spiral springs. A spring module 140 which forms only a part of a second embodiment, is shown in FIGS. 9 to 10, the purpose being to show an alternative embodiment which may find useful application. In the two embodiments, like numerals depict like parts, such that spring module 40 in embodiment 1 is like spring module 140 in embodiment 2.

Turning to embodiment one, in FIGS. 1, 2, 3 4, 7 and 8, the energy converter 10 includes an axle 20 for operatively mounting a plurality of spring elements. There is a plurality of spring modules, in the embodiment shown being two: a first spring module 40 and a second spiral spring module 50. Each of the spring modules includes one or more spiral spring elements 41, 42 and 51, 52 each spiral spring element has a spiral winding extending from a first end to a second end. The first end is the inner end 43, 44 and 53, 54 and the winding extends from there to the second end, which is an outer end 45, 46 and 55, 56.

The spring elements are operatively connected at each inner end to the axle 20 in the following way. Two of the inner ends 44, 53 are mounted on carrier brackets 57 which are bolted at their base to the axle 20, while the other inner ends 43 and 54 are free to roll on a bearing sleeve 98 on axle 20, and are fixed to the axle by end stops 97, 98 so that they are configured to transmit the torque from the axle 20 through the spring elements to the frame 5.

As for the outer ends, at least the adjacent spring elements 42, 51, in the first and second spiral spring modules 40, 50, have their outer end 46, 55 operatively connected together with a link 60 extending between each module 40, 50. The link 60 is a plate assembly described below in detail that extends in the other direction also, across all the second ends 45, 46, 42, 55, 56 of the spring elements.

Axially, the arrangement of spiral windings in the first and second spiral spring modules 40, 50 are substantially reflected or mirrored across a plane 70 extending transverse to the axle 20, the plane 70 disposed between the first and second spiral spring modules 40, 50.

As to material, the spiral spring elements 41, 42, 51, 52, are flat spiral springs, and could be made of any material, including spring steel, plastic, glass fibre reinforced composite, carbon fibre reinforced composite, or other suitable material with the requisite elasticity which can store strain energy.

Series Spring Elements in Each Module are Oppositely Wound

The first spiral spring module 40 and the second spiral spring module 50 include their own series arrangement of springs, being formed from spiral spring elements 41, 42, 51, 52, as discussed above. Each spiral spring module 40, 50 includes two (or more if necessary) spiral spring elements having inner and outer ends and disposed adjacent one another in a series arrangement, by which it is meant that there is a connector 65 between 41 and 42, and 66 between 51 and 52. In practice the link and the connectors 60 and 65 are a single common bar or plate extending axially all the way between springs 41, 42, 51 and 52.

The first and second spiral spring elements 41, 42 in the first spiral spring module 40 are wound in opposite directions. The inner end 44 of the second spring element 42 is mounted on a radial head of a carrier bracket 57, which at its base is fastened with bolts through the axle 20, to transmit torque from the axle 20, while the inner end 43 of the first spring element 41 is rotatably connected via bearing by a sleeve 80 or suitable rotatable connector for free rotation about the axle 20. But as described herein, the rotating sleeve 80 allows the spring pair to receive and store the torque exerted between the axle 20 and the frame 5. The axle connection arrangement is shown most clearly on the section view of the converter shown in FIG. 8. The general connections to the axle 20 are shown, in particular the inner ends 44, 53 being fastened by bolts directly to the axle 20, and the inner ends 43, 54 being free to rotate about the guide axle by being mounted to a bearing-mounted sleeve 80. The arrangement indeed could be reversed, where the inner ends 44, 54 could be fixed to the axle while the inner ends 43, 44 could be sleeve mounted.

This configuration means that a torque applied to the axle 20 that tensions/winds up spring 41 via its inner end, also tensions/winds up spring 42 that receives its torque input from spring 41 at its outer end via connection link 60.

To be perfectly clear, while the inner ends 43 and 54 are bearing-mounted, there are stops provided and shown at 95, 96, 97 and 98. These are clutches 95, 96 which provides a release from energy storage when under selected conditions. In the case shown, the clutch 95, 96 is a simple stop 97, 98 which facilitates transfer of torque between the axle 20 and the frame 5 to energy in the springs when the axle is driven in one direction. The one-way nature of the stops allows no storage when driven in the other direction, at least, after a selected angular position of the axle relative to the frame. The clutch/simple stop arrangement by stops 97, 98 allows adjustment of the offset, since at a selected angular position there can be play in the system, which in certain circumstances can be desirable.

Returning to FIGS. 1 and 2, the link 60 between the spiral spring modules 40, 50 is shown. It is in the form of a plate assembly which includes a base plate 62 and a closure plate 63 fastened together by bolts. The base plate 62 is wider than the closure plate 63 to provide broad support for the spring element ends 45, 46, 55, 56. Furthermore, the base plate 62 includes a wing 67, 69 on each side of a central spine 71 to provide the broad support for the spring ends. The wing 67, 69 tapers from the spine 71. At the end of each wing 67, 69 is disposed a rib 64 and 68 for providing wear resistance.
Advantages of the End Link Between Modules The adjacent spring elements 41 and 42 of the first spiral spring module 40 are connected via link 60 at their outer ends 45, 46 rather than their inner ends 43, 44. This enables the link 60 to move axially inwards and outwards as the springs are tensioned and released, and thus avoids the problems of uneven strain between different parts of the springs and/or contact between inner windings of some spring designs too early in the cycle. This arrangement is advantageous since it more efficiently accommodates large angular displacements.

Figure 1:
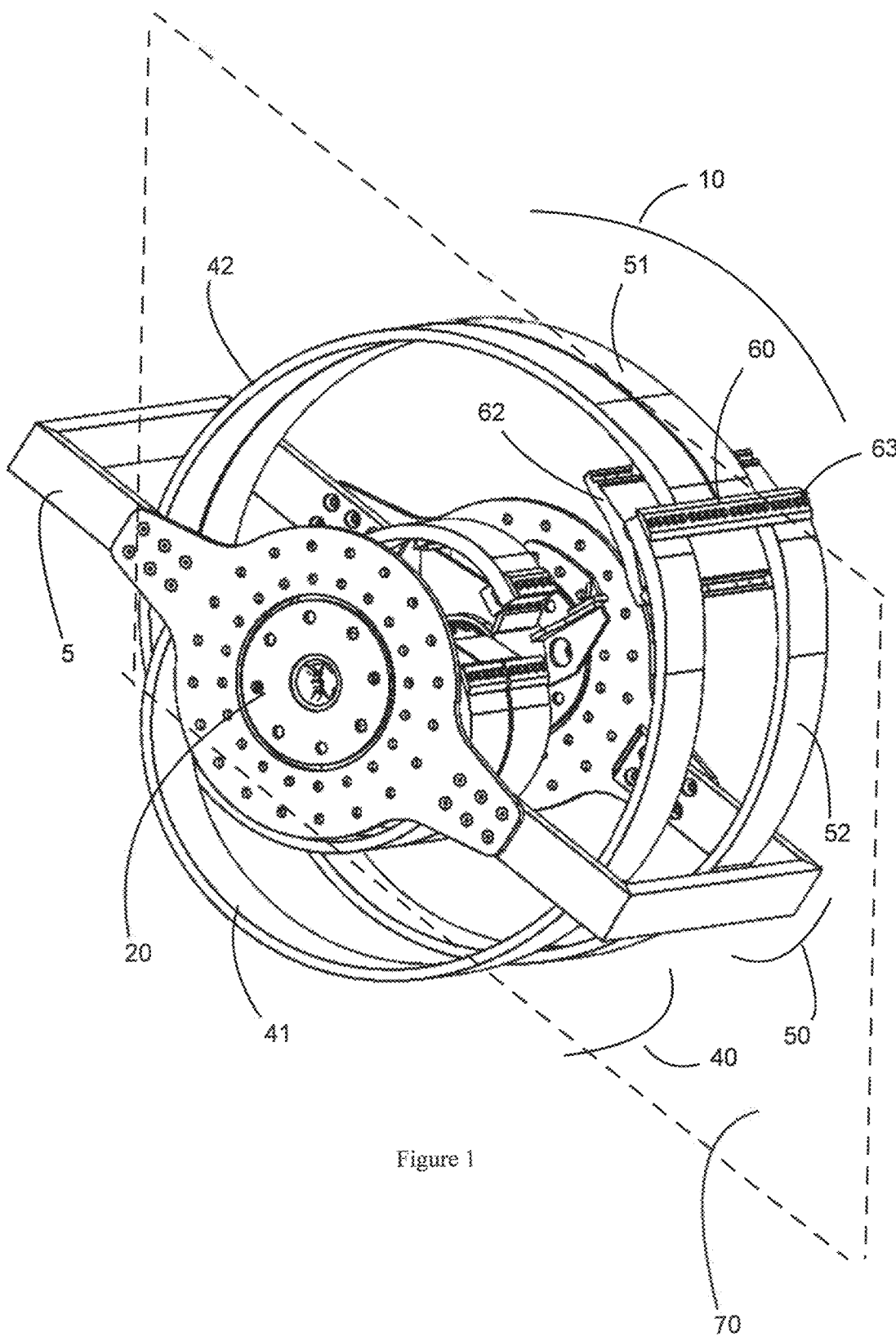
FIG. 1 is an isometric view of an energy converter which includes two series spring modules connected together at their outer ends with a common link.
Figure 2:
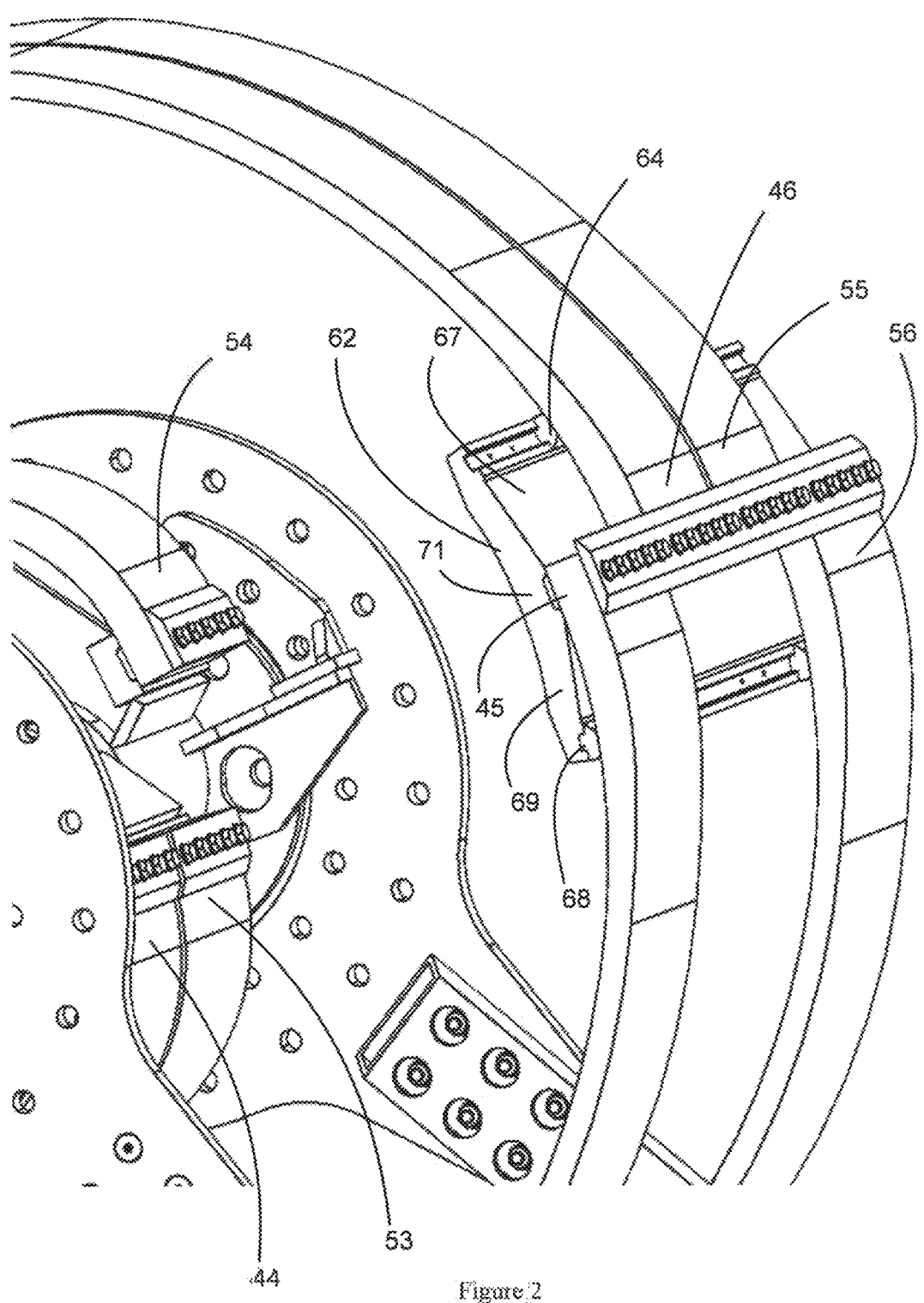
FIG. 2 is a detail view of the converter of FIG. 1, showing a close-up of the common link between the outer ends of the springs in the series spring modules.
Figure 3:
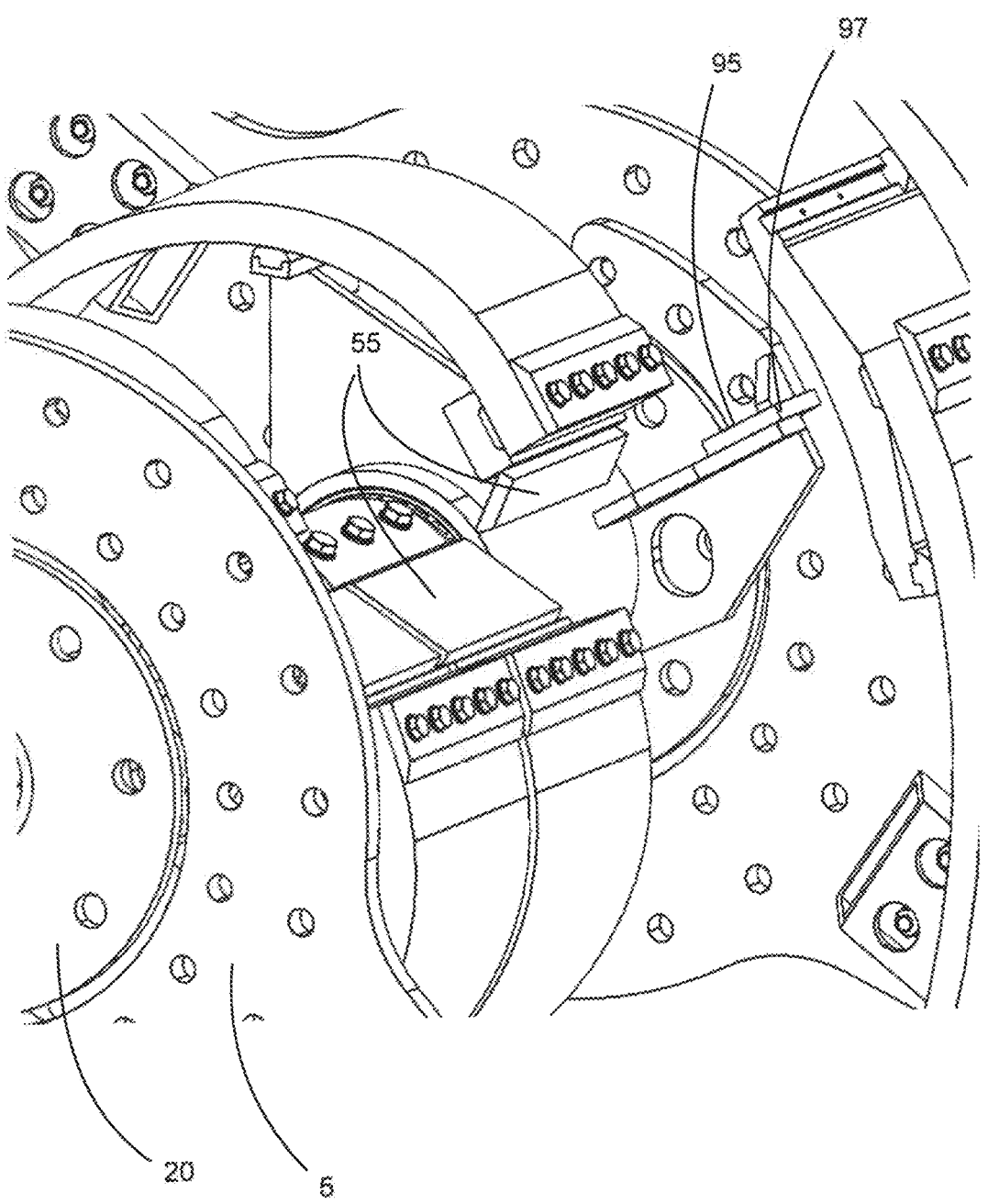
FIG. 3 is a detail view of the converter of FIG. 1, showing a close-up of the inner winding connections to the axle, and the clutch connection between the axle and the frame.
Figure 4:
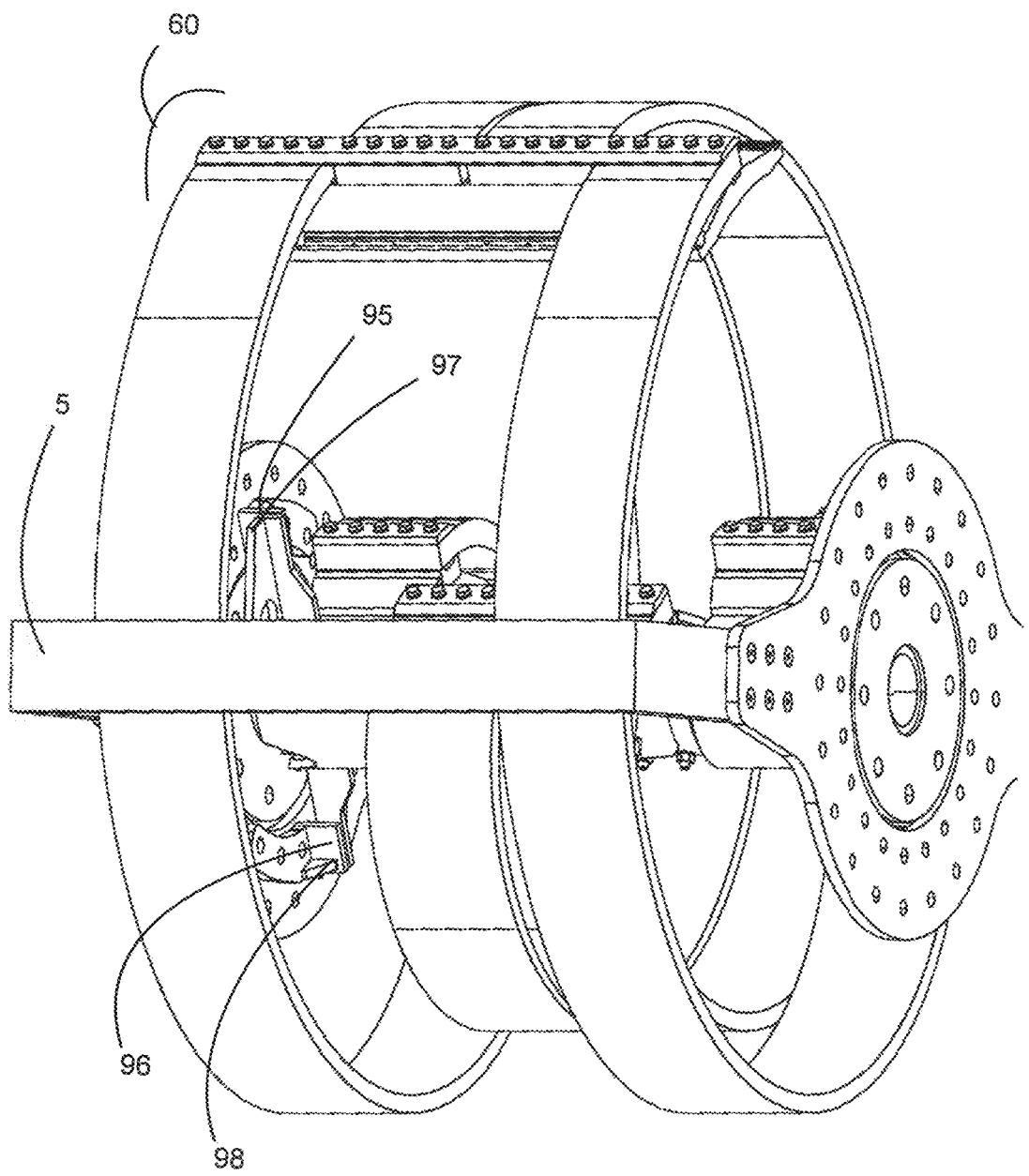
FIG. 4 is another isometric view of the converter, showing the clutch connections between the frame and the axle.

However, considering the forces acting on the link 60 arising from springs 41, 42 of the first spiral spring module 40, those forces tend to twist link 60. In FIG. 1 for example those forces will generate a counter-clockwise twist on link 60. Such a twist on link 60 would cause uneven strain on springs 41, 42 and hence result in local strain hotspots and hence may lead to undesirable failures of the springs.

Figure 5:
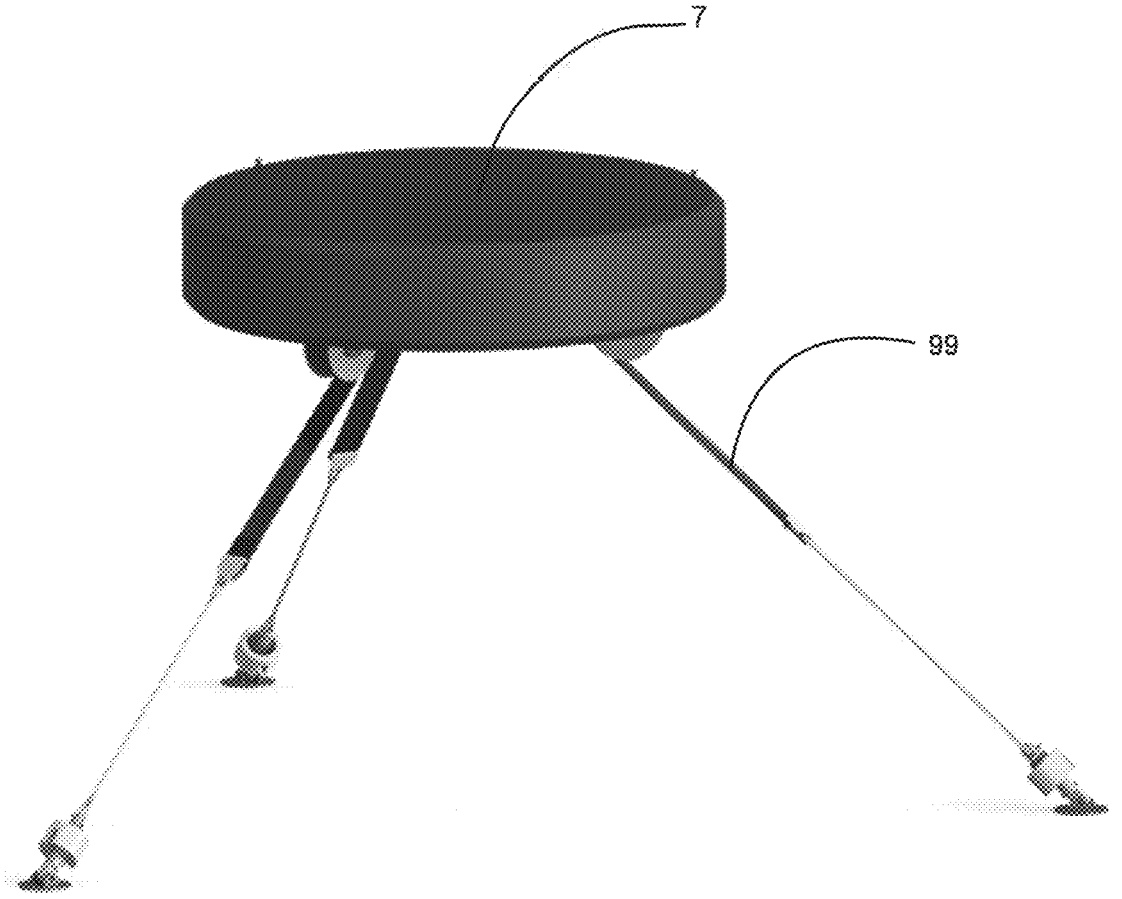
FIG. 5 is a perspective view of an application of the converter, which is a wave energy buoy on which one or more of the converters is mounted to deliver smoother power.
Figure 6:
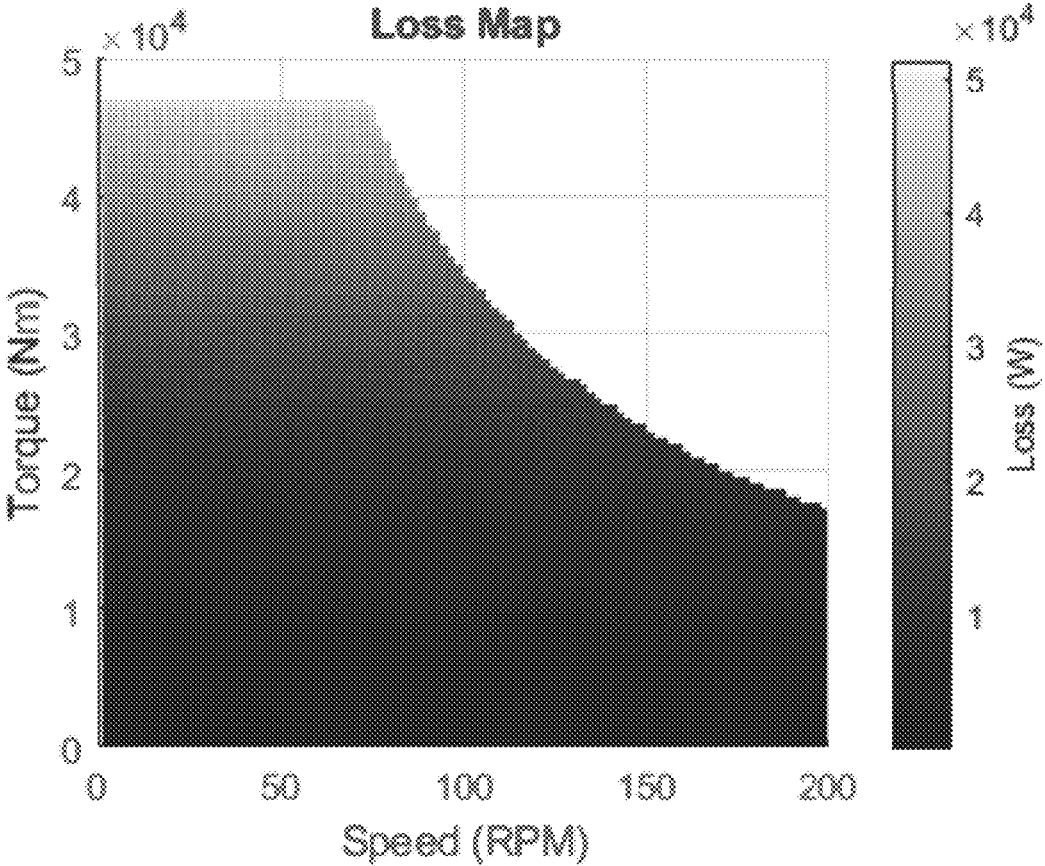
FIG. 6 is a graph showing torque operating region of converter, which facilitates more efficient delivery of power by providing lower losses, in effect moving the operating region of the motor and generator to a lower torque region.
Figure 7:
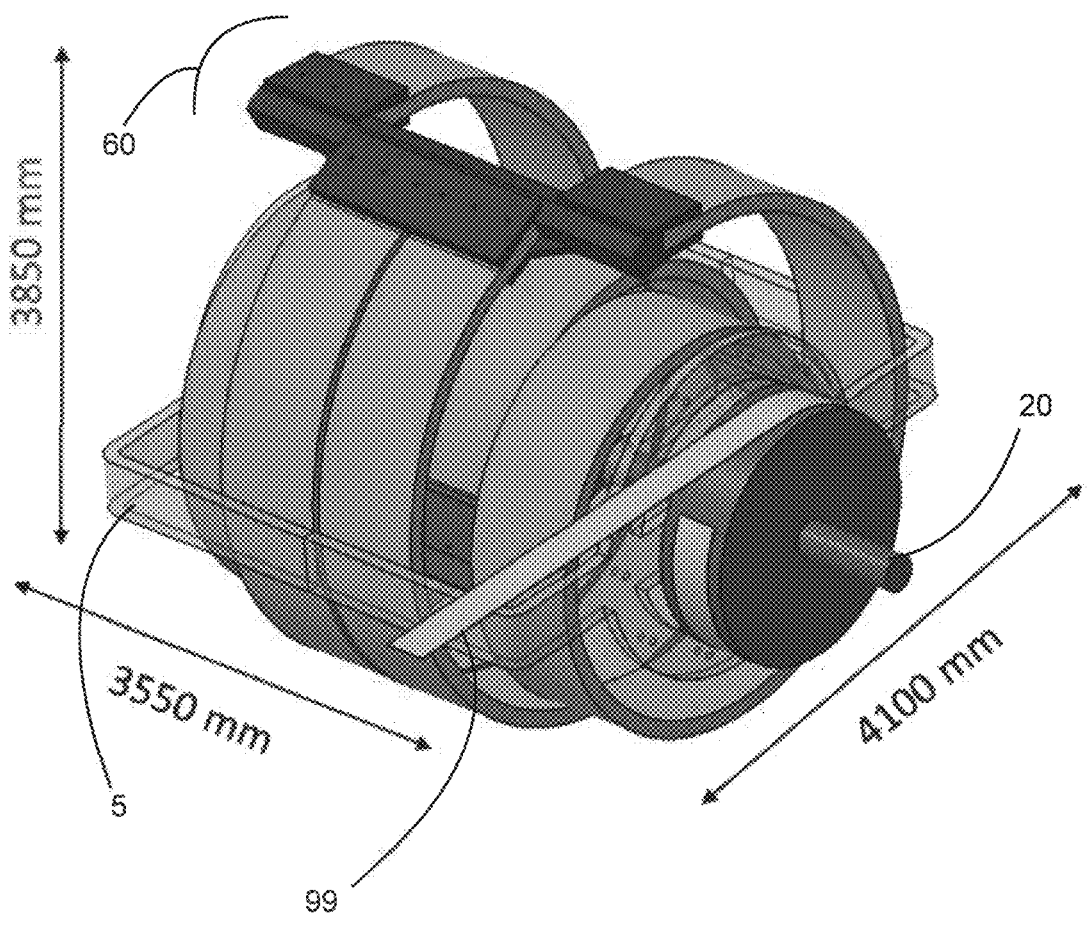
FIG. 7 shows an application of the converter, showing a drum and belt which drives the axle to convert energy during a wave cycle.
Figure 8:
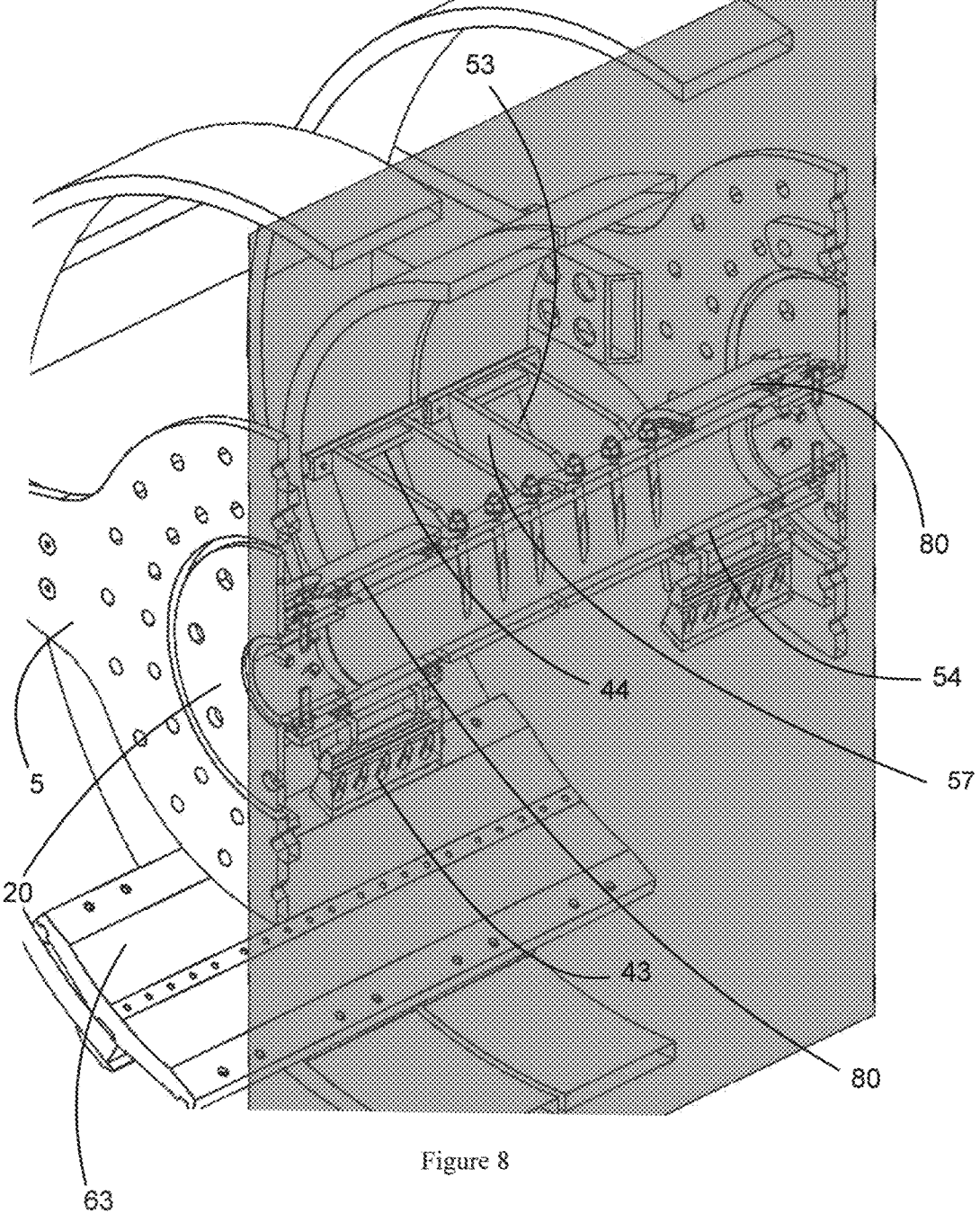
FIG. 8 is a section view of the converter, showing the axle operatively fastened to the inner ends of half of the springs in the spring modules, while the other half of the springs are operatively connected to the axle on a rotatable sleeve.

By addition of the second spiral spring module 50, mirrored axially symmetric to the first spiral spring module 40 and joined by a single link 60, the counter-clockwise twist on link 60 originating from springs 41, 42 is now balanced by an equal and opposing clockwise twist originating from springs 51, 52. The resulting design of the energy converter can now achieve maximum energy storage and cycle lifetime for any chosen spring material.
Operation In operation the torque applied between the axle 20 and the frame 5 is stored by the spring elements operatively mounted therebetween. When torque is applied, the inner ends 43, 54 being bolted to the axle 20 drive the energy into the spring elements 42, 51 and then through the link 60 into springs 41, 52 which resist the torque via the stops 97, 98. To apply the torque, a belt, strap or webbing or cable 99 (shown in FIG. 5) rotates the axle 20 relative to frame 5, which is mounted to the wave buoy 7. An initial rotation sets an offset angle of axle 20 relative to frame 5 which provides a preload of energy stored in the system. This inhibits slack in the mooring cable 99. Then when the buoy 7 moves upwardly under the influence of a wave, the cable 99 rotates the axle 20 relative to frame 5 to cause the storage of more energy in the spring elements for later release on the down stroke of the buoy 7 on the wave.

Second Embodiment—FIGS. 9 to 10

Spiral spring module 140 is shown in FIG. 9 which shows spiral spring elements 141 and 142 linked by a link 160 by their inner ends 143 and 145. The first spiral spring element 141 is operatively connected to an axle 120 via a crank 107, which in use introduces torque to the springs 141 and 142 when the torque is applied between the frame 105 and the axle 120.

The first end 143 is the inner end and the second end 145 is the radially outer end of spiral spring element 141. The first end 143 is free to move radially when there is torque applied between the frame 105 and the axle 120/crank 107. There is a link 160 extending to the second spring 142 in the module via the inner ends of the springs. The inner end 144 of second spring 142 is free to move radially in and out on application of the torque between the frame 105 and the axle 120.

The second embodiment module 140 is described in this specification to show that there may be other structures contemplated for different applications which provide a similar result and fall within the scope of the invention.

Module 140 would work in conjunction with a similar module 150 just as module 40 in the first embodiment works in conjunction with module 50 to address the asymmetry in forces discussed in the specification.

In another embodiment, the common link 60 and one or more of the spring elements attached to it may be manufactured as a single item rather than being assembled from individual parts.

It will be understood to persons skilled in the art of the invention that many modifications may be made without departing from the spirit and scope of the invention.

It is to be understood that any prior art publication referred to herein does not constitute an admission that the publication forms part of the common general knowledge in the art.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. An energy converter for converting rotational energy to mechanical strain energy in spiral springs, the converter unit including:
a frame;
an axle for receiving a torque, the axle operatively mounted on the frame for rotation;
a plurality of spiral spring modules, each one operatively mounted to the axle and the frame, each spiral spring module including
at least first and second serially-connected spiral spring elements having first and second ends radially spaced from one another, the first spiral spring element being oppositely-wound from the second spring element, the first end of at least one of the serially connected spring elements being operatively connected to the axle, with the first end of at least one other serially connected spring element being operatively connected to the frame,
wherein the second end of each spring element is free to move radially inward and outward, and operatively connected by a link such that the link extends across all the second ends of the springs in the plurality of spiral spring modules.

2. The energy converter in accordance with claim 1 wherein the windings of the spring elements in the first and second spiral spring modules are substantially reflected or mirrored across a plane disposed between the first and second spiral spring modules.

3. The energy converter in accordance with claim 1 wherein the spiral spring elements are flat spiral springs.

4. The energy converter in accordance with claim 1 wherein the first end of any one of the spiral springs is disposed radially inward relative to the second end.

5. The energy converter in accordance with claim 1 wherein the first and second spiral springs in each module include a first spiral spring and a second spiral spring operatively connected to one another by the link extending between the outer ends.

6. The energy converter in accordance with claim 1 wherein the link is a bar linking the outer ends of the spiral spring assemblies and modules to allow pivoting between the outer ends of adjacent springs.

7. The energy converter in accordance with claim 1 wherein the link is a plate assembly that is fastened to the outer ends of springs in the first and second spiral spring modules.

8. The energy converter in accordance with claim 7 wherein the plate assembly includes a base plate and a closure plate.

9. The energy converter in accordance with claim 1 wherein there is provided a power input operatively connected to the guide axle to rotate a pivoting connection for storage of energy in the springs.

\* \* \* \* \*